US006150872A

United States Patent [19]

McNeill et al.

[11] Patent Number: 6,150,872

[45] Date of Patent: Nov. 21, 2000

[54] CMOS BANDGAP VOLTAGE REFERENCE

[75] Inventors: Bruce W. McNeill, Allentown; Robert W. Walden, Bethlehem, both of Pa.

[73] Assignee: Lucent Technologies Inc., Murray Hill, N.J.

[21] Appl. No.: 09/141,910

[22] Filed: Aug. 28, 1998

[51] Int. Cl.[7] .......... G06F 1/10

[52] U.S. Cl. .......... 327/539; 327/538; 323/313; 323/316

[58] Field of Search .......... 323/312, 313, 323/315, 316; 327/538, 539, 513

[56] References Cited

U.S. PATENT DOCUMENTS

| | | | |
|---|---|---|---|
| 4,317,054 | 2/1982 | Caruso et al. | 307/297 |
| 4,399,399 | 8/1983 | Joseph | 323/316 |
| 4,622,512 | 11/1986 | Brokaw | 323/313 |
| 4,931,718 | 6/1990 | Zitta | 323/313 |
| 5,061,862 | 10/1991 | Tamagawa | 323/316 |
| 5,512,817 | 4/1996 | Nagaraj | 323/316 |
| 5,646,518 | 7/1997 | Lakshmikumar et al. | 323/316 |
| 5,666,046 | 9/1997 | Mietus | 323/316 |
| 5,867,013 | 2/1999 | Yu | 327/539 |
| 5,900,773 | 5/1999 | Susak | 327/539 |

*Primary Examiner*—Jung Ho Kim

*Attorney, Agent, or Firm*—Ian M. Hughes; Steve Mendelsohn

[57] ABSTRACT

A bandgap voltage reference circuit for 0.35-μm, 3-volt CMOS technology operates in an essentially temperature independent manner and having low supply voltages. The bandgap voltage reference circuit incorporates two operational amplifiers. One operational amplifier biases bipolar devices of the circuit and generates a PTAT voltage across a resistor, and the other operational amplifier buffers a voltage related to the PTAT voltage and a voltage across one bipolar device to generate the bandgap voltage reference. In one embodiment, the circuit includes a start-up circuit to ensure a stable and desired start-up state. A current bias may also be provided. The bandgap voltage reference of the second operational amplifier may also provide a regulated supply for the first stage of the circuit. The second operational amplifier also provides a buffered output to a resistor divider circuit to supply a voltage divider to generate voltages below the 1.24-volt bandgap voltage. The bandgap voltage reference circuit includes two versions, one which is optimized for a low supply voltage potential $V_{DD}$ of approximately 1.8 volts and the other for a standard supply voltage $V_{DD}$ of approximately 2.4 volts.

23 Claims, 6 Drawing Sheets

CM OS BANDGAP VOLTAGE REFERENCE

BACKGROUND OF THE INVENTION

1. Field of the Invention

The present invention relates to bandgap voltage reference circuits, and, more particularly, to temperature-independent bandgap voltage reference circuits having low supply voltage.

2. Description of the Related Art

Applications for portable, battery-operated equipment or systems employing complex, high-performance electronic circuitry have increased recently with the widespread use of cellular telephones, laptop computers, and other systems. One of the essential building blocks for these applications is an integrated circuit (IC) having a low-voltage reference, which may be a bandgap voltage and current reference, to support most analog functions. In such systems, it is desirable for this low-voltage reference to operate at a relatively low power supply voltage, such as on the order of 1.2 to 3.0 volts. Also, it is desirable that the low-voltage reference be stable and substantially immune to temperature variations, power supply variations, and noise.

Typically, a circuit known as a bandgap voltage reference generator is employed to provide the desired stable reference, or bandgap voltage reference. One such bandgap voltage reference generator is described in U.S. Pat. No. 5,512,817, entitled "Bandgap Voltage Reference Generator", by Nagaraj, issued Apr. 30, 1996. Such a generator is particularly useful for a variety of applications; however, bandgap voltage reference circuits as described in the aforementioned patent typically utilize a power supply on the order of about 4 volts to produce a bandgap voltage reference of about 1.25 volts. It may be desirable, in some circumstances, instead to have a current source that produces a current substantially proportional to absolute temperature (PTAT). Such a current source may be employed to provide a bandgap voltage reference, while also providing greater flexibility with respect to alternate applications. A PTAT current source that is capable of providing a current substantially proportional to absolute temperature and operating satisfactorily with a relatively low supply voltage, such as below 4 volts, is described in U.S. Pat. No. 5,646,518 by Lakshmikumar et al. issued Jul. 8, 1997.

Existing 0.35 $\mu$m, 3.0-volt bandgap voltage reference circuits have a worst-case simulated temperature variation of about 4% from −40° C. to +125° C. after trimming of the IC. While this worst-case variation may be adequate for most wireless applications, it does not leave adequate margin of operation in some cases. Furthermore, as supply voltages drop below 2.4 volts, the typical 1.24-volt bandgap output voltage is too high for most common-mode voltage applications and must be re-buffered to a lower voltage (typically about Vdd/2), even if no DC load is driven.

SUMMARY OF THE INVENTION

The present invention relates to a bandgap voltage reference circuit including a proportional to absolute temperature (PTAT) voltage generator and a voltage buffer. The PTAT voltage generator is adapted to generate a first PTAT voltage across a first impedance and a second PTAT voltage across a first device in a first current path, and a third PTAT voltage across a second device in a second current path. Each of the second and third PTAT voltages conform approximately to a diode junction equation for the corresponding device; the first device is coupled in series with the first impedance in the first current path; and the PTAT voltage generator biases a sum of the first and second PTAT voltages to the third PTAT voltage. The voltage buffer is adapted to receive a voltage across a second impedance and the third PTAT voltage to generate a bandgap voltage at an output terminal. The voltage across and current through the second impedance are substantially proportional to the first PTAT voltage across and current through the first impedance, respectively; and the voltage buffer biases the voltage across the second impedance with the third PTAT voltage so as to regulate the bandgap voltage.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
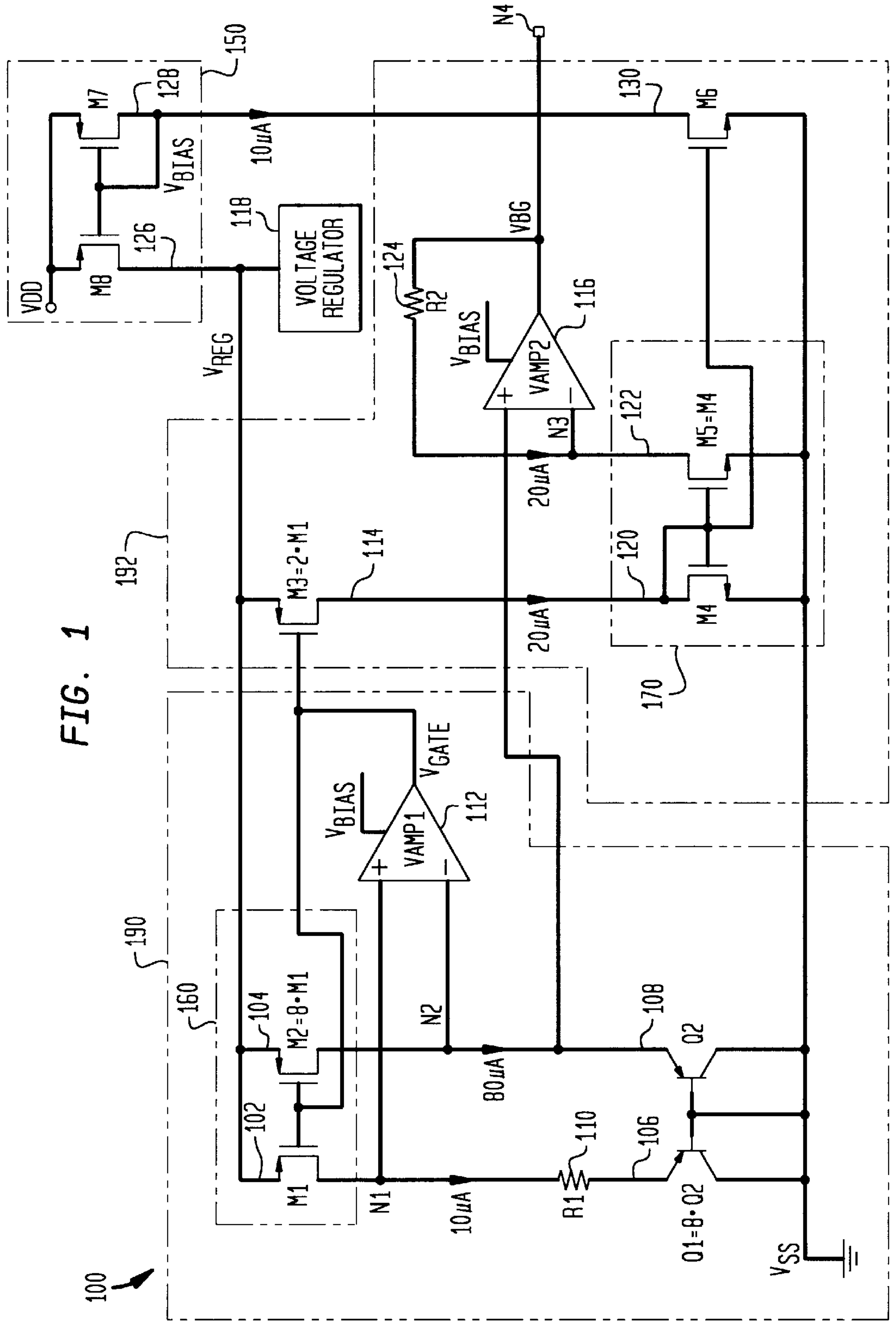
FIG. 1 is a circuit diagram of a bandgap voltage reference circuit in accordance with an embodiment of the present invention.

Referring to FIG. 1, there is shown a bandgap voltage reference circuit 100 in accordance with one embodiment of the present invention. As shown in FIG. 1, bandgap voltage reference circuit 100 comprises a current source 150 as a power supply, voltage regulator 118, first stage 190, and second stage 192. First stage 190 is a proportional to absolute temperature (PTAT) voltage generator driven by the current source 150. First stage 190 comprises a first current mirror 160 having MOS devices 102 and 104, a load resistor 110 with resistance R1, a pair of semiconductor devices shown as PNP transistors 106 and 108 having device sizes Q1 and Q2, and a first operational amplifier (VAMP1) 112. Second stage 192 is a current mirror and voltage buffer. Second stage 192 comprises a second current mirror 170 having MOS devices 114, 120 and 122, a second operational amplifier (VAMP2) 116 having feedback resistor 124 with resistance R2, and MOS device 130.

Current source 150 may be realized as a pair of MOS devices 126 and 128, for example, and as a current mirror coupled across a voltage source, such as $V_{DD}$, to a regulated voltage $V_{REG}$, although the scope of the invention is not limited in this respect. For the circuit of FIG. 1, the term "operational amplifier" for VAMP1 112 and VAMP2 116 refers to a device that directly compares two voltage levels or voltage signals, and provides an amplified output voltage signal response based at least in part on the voltage signal comparison. For example, VAMP1 112 compares the voltage across both load element 110 and PNP transistor 106 at node N1 with the voltage across PNP transistor 108 at node N2.

As illustrated in FIG. 1, MOS devices 102 and 104 are coupled so as to provide a first current mirror having proportional currents in first and second paths. As is known in the art, current passing through a MOS device is proportional to a gate-width of the device. A ratio of the first current to the second current is thus determined by a ratio of the sizes of MOS devices 102 and 104. MOS device 104 may have a gate width approximately eight times larger than that of MOS device 102. Thus, as illustrated, a first current I1 of approximately 10 $\mu$A flows through the first current path at node N1, and a second current 12 of approximately 80 $\mu$A flows through node N2. MOS devices 102 and 104 have gates electrically coupled to the voltage comparison, $V_{GATE}$, generated by VAMP1 112. The voltage $V_{GATE}$ provided by VAMP1 112 causes the drain-to-source voltages of MOS devices 102 and 104 to be substantially equal, and also causes MOS devices 102 and 104 to operate at or near a saturation region during circuit operation of bandgap voltage reference circuit 100.

VAMP1 112, by operating MOS device 102 so as to provide current I1, causes voltage $V_{R1}$ to appear across the load resistor 110. In addition, a feedback of $V_{GATE}$ provided by VAMP1 causes the voltages of nodes N1 and N2 to be approximately equal. As illustrated in FIG. 1, bipolar PNP transistors 106 and 108 are coupled to the first and the second current paths through nodes N1 and N2, respectively. Thus, currents flowing through the first and second current paths are related to voltages of bipolar PNP transistors 106 and 108 located along the first and second current paths, respectively. Such relation substantially follows a diode junction equation. Nonetheless, the invention herein is not limited in scope to the use of PNP or NPN bipolar transistors and other semiconductor devices may be employed. For example, diodes or MOS devices operated in a sub-threshold region may alternatively be employed. Thus, the term "semiconductor device" refers herein to a device comprising semiconductor material that includes a semiconductor junction in which, for the device, a relationship between the current density, J, through the device and the voltage, V, across the device or any portion thereof approximately follows the diode junction equation (1):

$$J=J_o(e^{V/V_T}-1) \qquad (1)$$

where $J_o$ is the reference current density, $V_T$ is the thermal voltage and equals kT/q, with k being Boltzman's constant, T being absolute temperature and q being a charge on an electron. For some applications, the voltage, V, may approximately follow equation (1) due to a series resistance, current leakage or other losses in the device. A base-to-emitter voltage $V_{BE}$ across each of the pair of PNP transistors 106 and 108 is given by equation (2):

$$V_{BE}=V_{BEo}+V_T\ln(J/Jo) \qquad (2)$$

where J is the current density through the device, and $V_{BEo}$ is the reference voltage for the reference current density $J_o$. These parameters may be adjusted due to process dependency. In addition, since the voltage of nodes N1 and N2 are substantially equal, the base-to-emitter voltage across PNP transistor 108 is substantially equal to the base-to-emitter voltage across PNP transistor 106 added to the voltage across load resistor 110. A voltage difference $V_{diff}$ between the base-to-emitter voltages $V_{BE1}$ and $V_{BE2}$ of PNP transistors 106 and 108, respectively, appears as a voltage $V_{R1}$ across load resistor 110. The voltage difference is equivalent to the voltage difference given by equation (3):

$$V_{diff} = V_{RI} = V_T\ln\left(\frac{Q_1/Q_2}{M_1/M_2}\right) \qquad (3)$$

For the exemplary embodiment of FIG. 1, the ratio of PNP device sizes Q1/Q2 is given as 8 and the ratio of the MOS device sizes M1/M2 is given as 1/8, hence $V_R=V_T$ ln(64) =108 mV at 300K.

Load resistor 110, having resistance R1, may be a combination of N+ and Ntub resistors chosen to have a composite temperature coefficient such that the resistance R1 is roughly proportional to absolute temperature over the temperature range of interest. Further, the base-to-emitter voltage $V_{BE}$ as given in equation (2) may also vary in proportion to absolute temperature.

In accordance with the present invention, second stage 192 is employed as a voltage buffer to provide a voltage $V_{BG}$ derived from the voltages $V_{R1}$ across load resistor 110 and the base-to-emitter voltages of PNP transistors 106 and 108 of the PTAT voltage generator. MOS device 120 of second current mirror 170 is diode-connected with its drain electrically coupled to its gate in order that a positive voltage applied to the gate of MOS device 120 operates the device at or near the saturation region. Since the base-to-emitter voltages $V_{BE1}$ and $V_{BE2}$ of PNP transistors 106 and 108, respectively, decrease almost linearly with temperature, an almost temperature-independent voltage may be achieved by adding a temperature dependent variation in the voltage $V_{BE2}$ across PNP transistor 108 to a scaled version of the voltage $V_{R1}$ appearing across load resistor 110. This may be accomplished as described subsequently.

Current through MOS device 102 is mirrored by MOS device 114, which may be desirably chosen with a gate width M3 double the gate width M1 of MOS device 102 so as to provide a current of, for example, 20 $\mu$A through MOS device 120. Current mirror 170, in turn, operates to provide an equivalent current of, for example, 20 $\mu$A through MOS device 122 since MOS devices 120 and 122 have equivalent gate widths. Also, there is shown in FIG. 1 a diode-connected MOS device 130 in series with MOS device 128 of current source 150. The current through MOS device 130 is mirrored from MOS device 120 in steady state operation of the bandgap voltage reference circuit 100. Further, current of MOS device 130 is mirrored by MOS device 128 into MOS device 126.

Current appearing at node 3 passing through MOS device 122 also passes through feedback resistor 124 of VAMP2

116. The feedback path of VAMP2 116 through feedback resistor 124 drives the voltage of nodes N2 and N3 to be approximately equal. The voltage $V_{BE2}$, which is the base-to-emitter voltage and voltage $V_{R1}$ across load resistor 110, across PNP transistor 108 appears at node N2 at one input terminal of VAMP2 116. The voltage across the feedback resistor 124 is $V_{R2}$, and the voltage appearing at the input terminal of VAMP2 116 at node N3 is approximately $V_{BG}-V_{R2}$, which is driven to $V_{BE2}$ by operation of VAMP2 116. The voltage $V_{R2}$ across the feedback resistor 124 is proportional to the voltage $V_{R1}$ across load resistor 110 by operation of the current path through MOS device 122 being proportional to the current of MOS device 102. Consequently, a variation in voltage. $V_{BE2}$ and an opposite variation in voltage $V_{R1}$ due to temperature is reflected in voltage $V_{BG}$. Consequently, the voltage $V_{BG}$ is approximately constant with temperature.

In accordance with the present invention, voltage $V_{R1}$ across load resistor 110 is proportional to absolute temperature, or PTAT. An almost temperature-independent voltage $V_{BG}$ may thus be achieved by adding the varying base-to-emitter voltage $V_{BE}$ across PNP transistor 108 to the appropriately scaled varying PTAT voltage $V_{R1}$ appearing across load resistor 110. Scaling may be accomplished by tuning a ratio of the resistance values $R_1/R_2$. Consequently, the current through load resistor 110 may be approximately independent of temperature. Further, since a supply current from current source 150 for the entire voltage reference 100 is mirrored through the second stage 192 from the current through load resistor 110, a total current consumption of the voltage reference 100 may remain nearly constant with temperature. For one implementation of the embodiment of FIG. 1, the value R1 of composite resistance of load resistor 110 is chosen such that, for the desired voltage $V_{BG}$, the current I1 through PNP transistor 106 is 10 mA and the current 12 through PNP transistor 108 is 80 mA. The resulting bandgap voltage $V_{BG}$, which may be near 1.24 volts, is tuned empirically by adjusting the ratio of resistance values R1/R2 of load resistor 110 and feedback resistor 124 for optimal temperature-dependent behavior over various processing and operating conditions.

Figure 2:
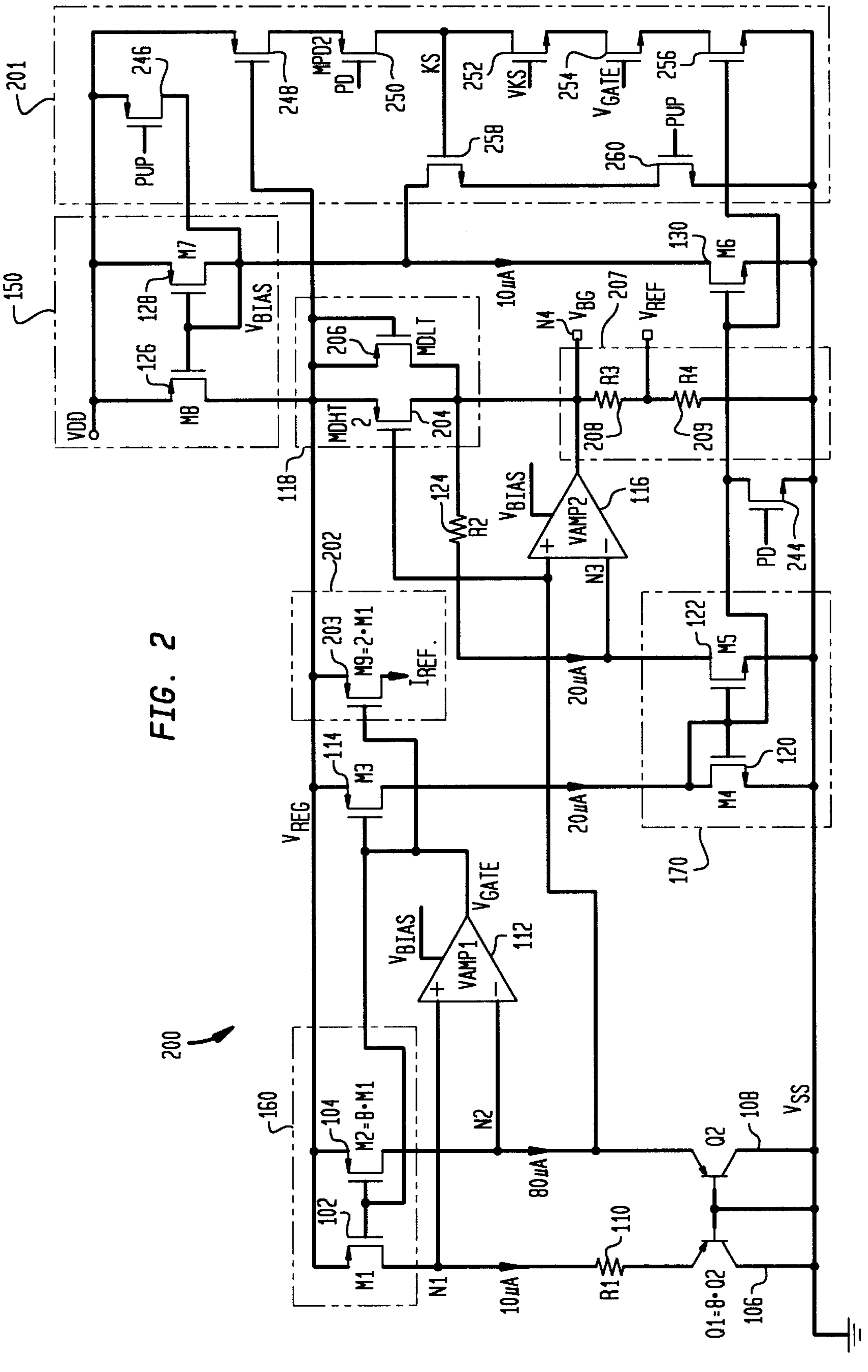
FIG. 2 is a circuit diagram of a bandgap voltage reference circuit of FIG. 1 in accordance with an alternative embodiment of the present invention.

FIG. 2 shows a bandgap voltage reference circuit 200 in accordance with an alternative embodiment of the present invention including voltage regulator 118, current bias reference 202, resistor-divider load 207, and start-up circuit 201. Operation in accordance with the present invention for the bandgap voltage reference circuit 200 is now described, and devices of FIG. 2 having the same reference numerals as devices shown in FIG. 1 operate in a manner similar to those devices described with reference to FIG. 1.

Resistor-divider load 207 having resistors 208 and 209 may be coupled between node N4 at voltage $V_{BG}$ and the common node voltage $V_{SS}$ to generate output voltages below, for example, 1.24 volts since the bandgap voltage $V_{BG}$ is buffered by VAMP2 116.

For bandgap voltage reference circuits with adequate headroom for supply voltage $V_{DD}$, a regulated supply voltage $V_{REG}$ is generally employed. Bandgap reference circuit 100 in accordance with the present invention may not have adequate headroom. Consequently, a modified voltage regulation method of $V_{REG}$ is employed for which the operational amplifiers VAMP1 112 and VAMP2 116 are connected directly to supply voltage $V_{DD}$. The simplest configuration for such voltage regulation may be to couple the output voltage $V_{BG}$ of VAMP2 directly to $V_{REG}$. However, better performance may be achieved by employing one or more devices coupled between $V_{BG}$ and $V_{REG}$. As shown in FIG. 2, voltage regulator 118 of FIG. 1 may be implemented by using two MOS devices 204 and 206. Better performance may be achieved with the use of either, or both, MOS devices 204 and 206.

MOS device 206 is desirably a standard-threshold, diode-connected N-channel device causing $V_{REG}$ to be regulated at a voltage well above $V_{BG}$, thus making the operating points of MOS devices 102, 104 and 114 less sensitive to temperature variation since nodes N1 and N2 rise in voltage as temperature drops. MOS device 206 is desirably employed for a standard supply voltage $V_{DD}$ of, for example, 2.4 volts.

MOS device 204 is desirably a low-threshold, diode-connected, N-channel device and is desirably employed for a low supply voltage $V_{DD}$ such as 1.8 volts. When the temperature is high, the voltage at node N2 is low enough to turn on MOS device 204, and the voltage $V_{REG}$ is just slightly above $V_{BG}$. When the temperature is low, the voltage at node N2 rises, and $V_{REG}$ rises above $V_{BG}$. This temperature-dependent voltage regulation of MOS device 204 improves the DC power supply rejection while permitting useful operation at supply voltages down to approximately 1.4 volts.

FIG. 2 also shows current bias reference 202 having MOS device 203 that mirrors the current through MOS device 102 so as to supply a current bias reference $I_{REF}$ proportional to the current through MOS device 102. Because the current through MOS device 102, and hence $I_{REF}$, is nearly constant with temperature, current bias reference 202 eliminates the need for a separate current reference generator as is typically required by bandgap voltage reference circuits of the prior art.

Because bandgap voltage reference circuit 100 has multiple feedback loops, more than one stable state of operation may be possible for the circuit shown in FIG. 1. Consequently, start-up circuit 201 as shown in FIG. 2 may be employed to cause the bandgap voltage reference circuit 100 to start-up and remain in the desired mode of operation. With reference to FIG. 2, MOS devices 246, 250, 260, and 244 are employed to power-up or power-down voltage bandgap reference circuit 100. Bandgap voltage reference circuit 100 is in an active state when the input voltage at node PUP is high (at voltage potential $V_{DD}$) and an input voltage at node PD is low (at potential $V_{SS}$). In the active state, MOS devices 250 and 260 are conducting ("on") while devices 246 and 244 are not conducting ("off").

Start-up circuit 201 includes MOS devices 248, 258, 252, 254 and 256. Without a start-up circuit such as start-up circuit 201, bandgap voltage reference circuit 100 normally has at least two stable states at power-up: 1) a zero-output voltage state and 2) a desired operating state. Start-up circuit 201 operates as follows at power-up. Initially no current flows in bandgap reference circuit 100 except in start-up circuit 201, so voltages $V_{REG}$, and $V_{GATE}$, and VKS and the voltage at node KS, are close to the common node voltage $V_{SS}$. Consequently, MOS device 248 is on, while MOS devices 258, 252, 254, and 256 are off. Current flowing through MOS device 248 charges the gate at node KS until MOS device 258 begins to conduct. Current flowing through MOS device 258 also flows through MOS device 128 (being in series), and current flowing through MOS device 126 is mirrored from MOS device 128 to provide power to the remainder of the circuit, causing $V_{REG}$, $V_{GATE}$, and the voltage VKS to rise. MOS devices 252, 254, and 256 begin to turn on, while falling voltage at node KS on the gate of MOS device 258 reduces the current flow through MOS device 258. The voltage at node KS continues to drop until MOS device 258 is turned off, and the bandgap voltage reference circuit becomes self-regulating. The combination of devices may insure a robust start-up process under a wide variety of start-up conditions.

MOS device 258 is turned on initially to generate a bias current for VAMP1 112, VAMP2 116, and the bipolar PNP transistors 106 and 108. Start up circuit 201 may constrain $V_{BG}$ to be a non-zero value, and may require $V_{GATE}$ of VAMP1 112 to be within a predetermined range. The predetermined range may be such that at least some bias current exists for MOS devices 102, 104, 114, 120 and 122 and such that current drawn from the regulated supply $V_{REG}$ is not excessive. The gate of MOS device 252 voltage VKS is desirably connected to the supply voltage $V_{REG}$. Start-up circuit 201 of FIG. 2 is a preferred embodiment for bandgap voltage reference circuit 100 having a standard voltage supply $V_{DD}$ of, for example, 2.4 volts.

Figure 3:
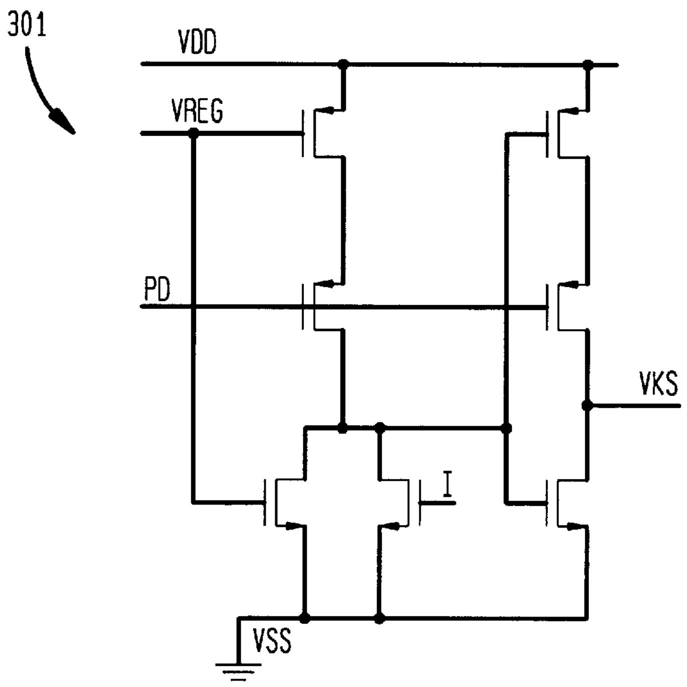
FIG. 3 shows additional circuitry of a start-up circuit of FIG. 2 for a bandgap voltage reference circuit having low supply voltage.

FIG. 3 illustrates circuit 301 that may be used in addition to start-up circuit 201 in accordance with the present invention. Circuit 301 may be preferred for a bandgap voltage reference circuit 200 providing $V_{BG}$ but having low supply voltage $V_{DD}$ (e.g. on the order of 1.8 volts or less). In the embodiment of FIG. 3, the gate of MOS device 252 of FIG. 2 is coupled to circuit 301 to receive the voltage VKS and not coupled directly to the regulated supply voltage $V_{REG}$. In order to start up bandgap voltage reference circuit 100 with a lower supply voltage $V_{DD}$, the circuit of FIG. 3 is employed to generate adequate gate voltage on MOS device 252 of FIG. 2. The higher gain that is provided by the start-up circuit 201 shown in FIG. 3 may cause circuit oscillations for $V_{DD}<1.0$ volt under some processing and temperature conditions, but bandgap voltage reference circuit 100 stabilizes before $V_{DD}$ reaches a useful operating range.

Figure 4A:
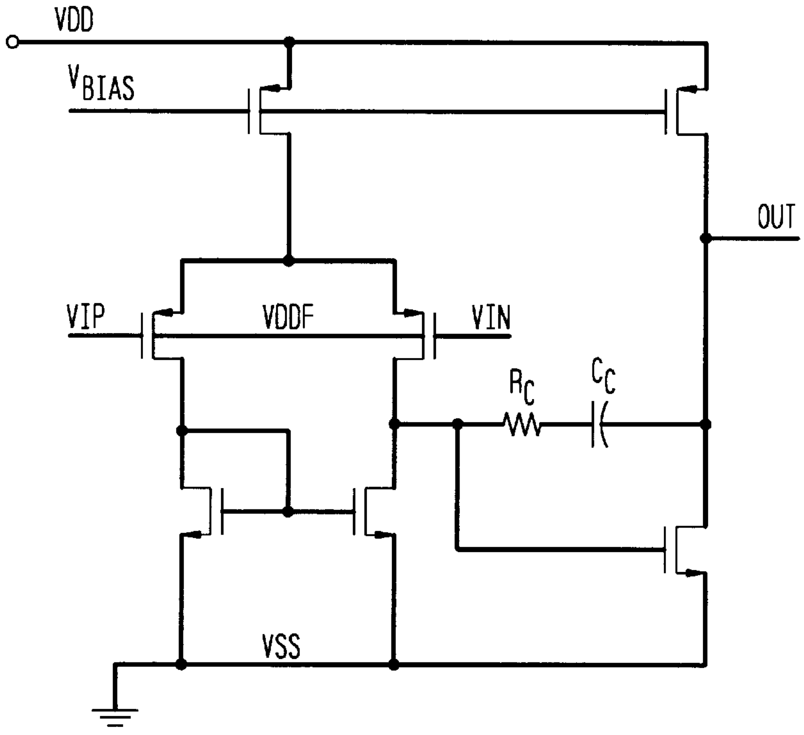
FIG. 4A shows an exemplary circuit as may be employed for an operational amplifier of FIG. 1.
Figure 4B:
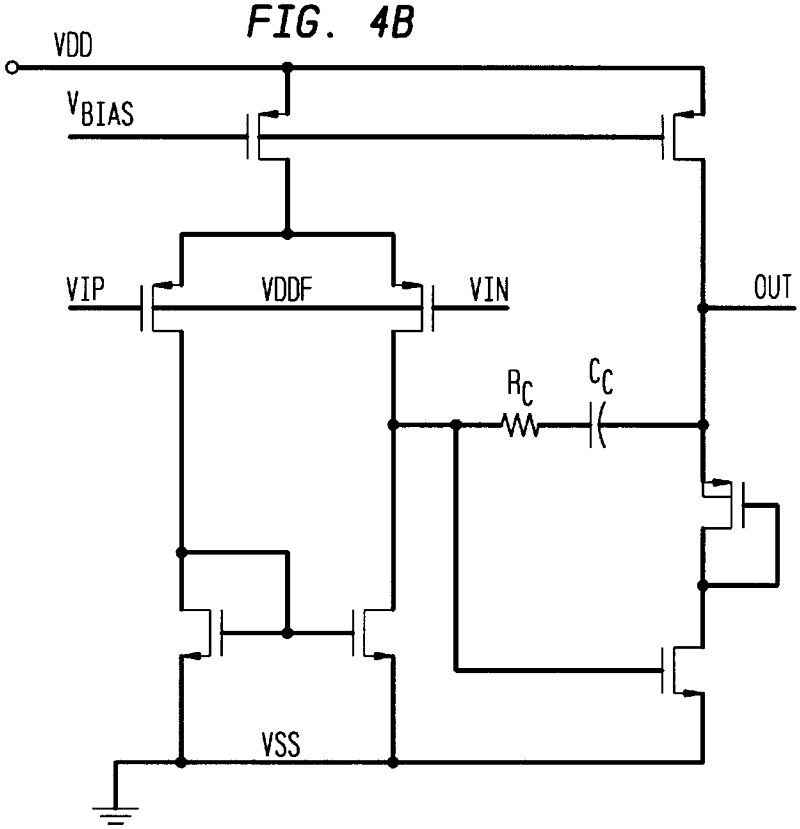
FIG. 4B shows an exemplary circuit as may be employed for an operational amplifier of FIG. 1.

FIGS. 4A and 4B show embodiments of the operational amplifiers as may be used for VAMP1 112 and VAMP2 116 of the bandgap voltage reference circuit 100 of FIG. 1. Operational amplifier VAMP2 is similar to operational amplifier VAMP1, but device sizes of VAMP2 may be selected as being larger than those of VAMP1 since VAMP2 desirably drives a larger output load. The operational amplifiers of FIGS. 3A and 3B preferred for a low supply voltage $V_{DD}$ of, for example, 1.8 volts may include low threshold input semiconductor devices. For a standard supply voltage of 2.4 volts, the operational amplifiers may employ standard threshold semiconductor devices.

The operational amplifier architectures as shown in FIG. 4A and FIG. 4B are exemplary only. As would be apparent to one skilled in the art, a variety of operational amplifier architectures may be employed in accordance with the present invention.

Figure 5A:
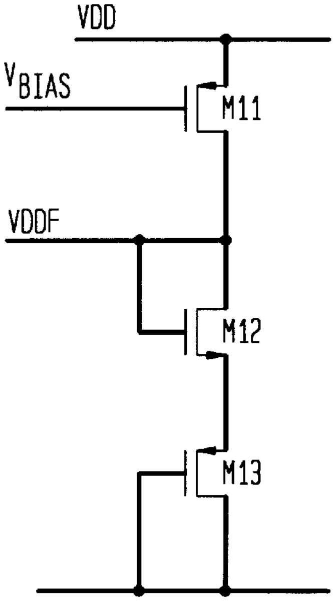
FIG. 5A shows a voltage regulation circuit for a voltage $V_{DDF}$ of the operational amplifiers shown in FIGS. 3A and 3B.
Figure 5B:
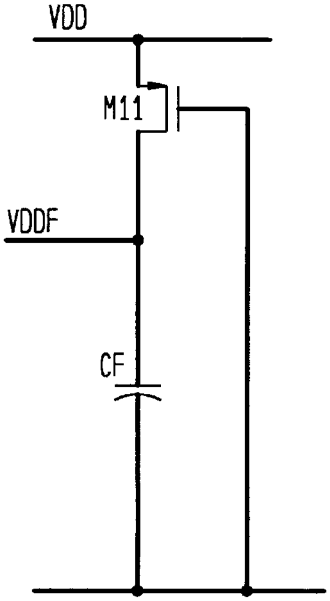
FIG. 5B shows an alternative voltage regulation circuit for a voltage $V_{DDF}$ of the operational amplifiers shown in FIGS. 3A and 3B.

To improve the power supply rejection ratio (PSRR), a voltage regulation circuit for the voltage $V_{DDF}$ for the operational amplifiers of FIG. 4A and FIG. 4B may be provided as shown in FIG. 5A. An alternative embodiment for the bias generator of $V_{DDF}$ for the operational amplifier of FIG. 3A is shown in FIG. 5B and may have better temperature performance. Under some processing conditions, the temperature dependence of the bandgap voltage increases slightly compared to the circuit of FIG. 5B, in which VDDF is connected to VDD through an R-C filter. PSRR may be significantly improved with a filter capacitor external to the bandgap voltage reference circuit 100.

Figure 6A:
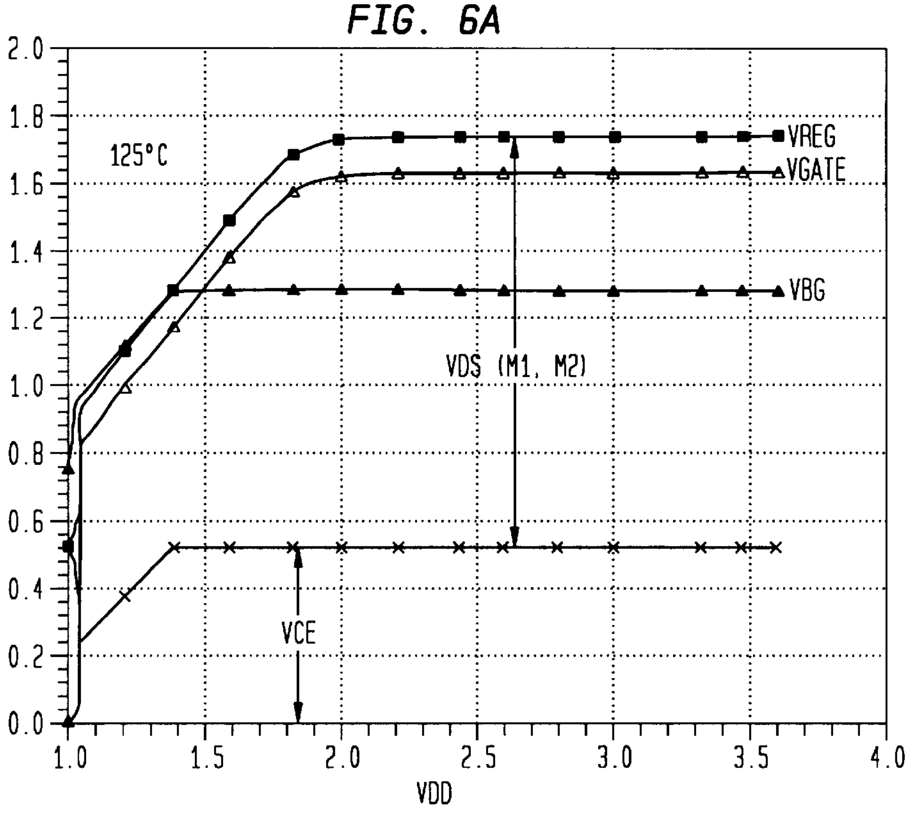
FIG. 6A shows circuit node voltages as a function of supply voltage $V_{DD}$ for an exemplary bandgap voltage reference circuit of FIG. 2 having low supply voltage and operating at a temperature of 125° C.
Figure 6B:
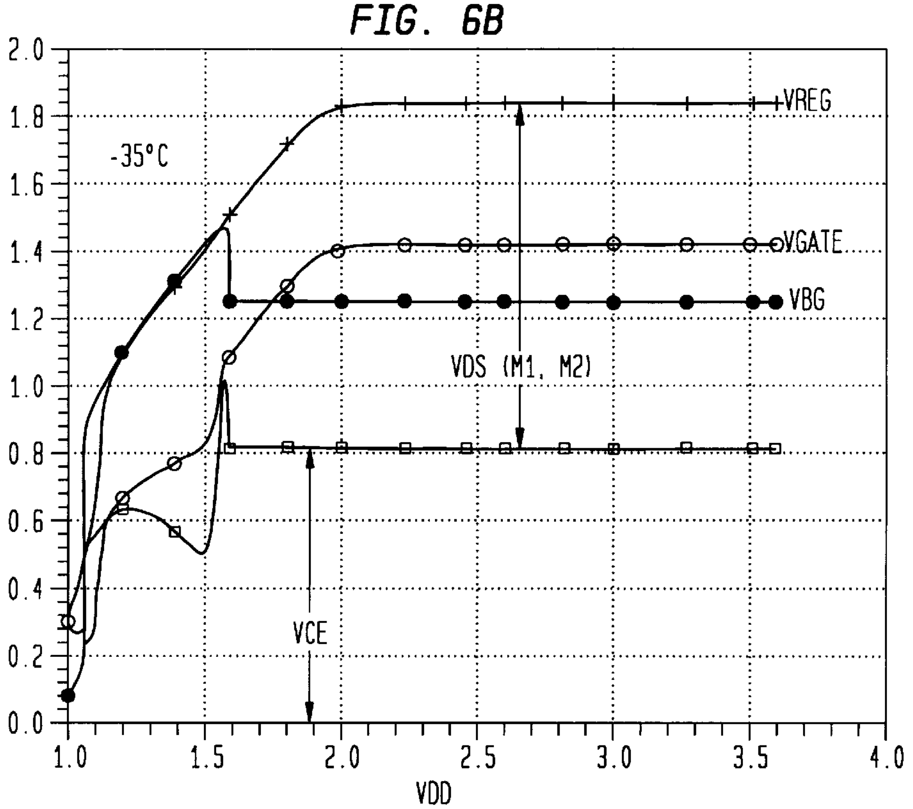
FIG. 6B shows circuit node voltages as a function of supply voltage $V_{DD}$ for an exemplary bandgap voltage reference circuit of FIG. 2 having low supply voltage and operating at a temperature of −35° C.
Figure 7A:
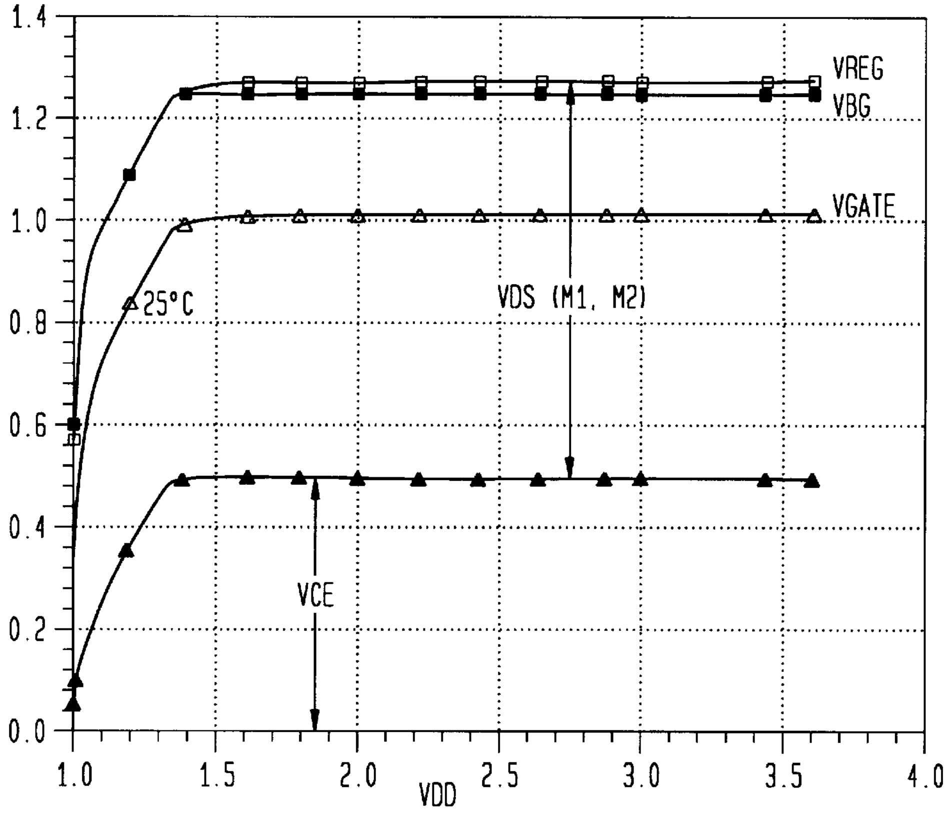
FIG. 7A shows circuit node voltages as a function of supply voltage $V_{DD}$ for an exemplary bandgap voltage reference circuit of FIG. 2 having a standard supply voltage and operating at a temperature of 125° C.
Figure 7B:
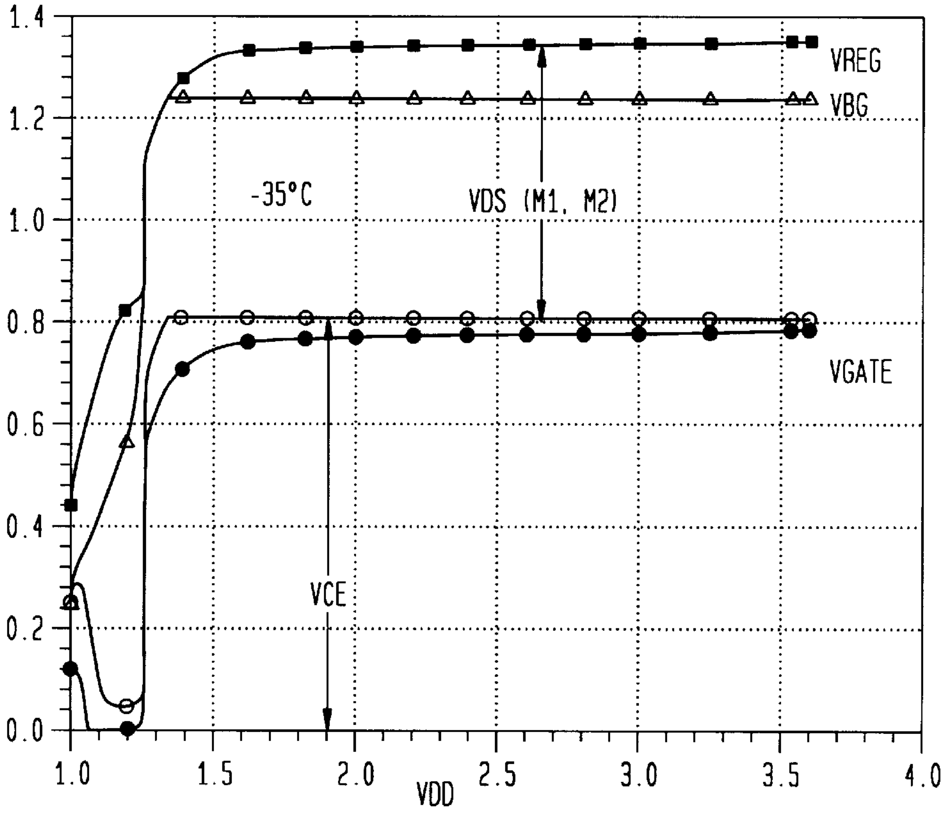
FIG. 7B shows circuit node voltages as a function of supply voltage $V_{DD}$ for an exemplary bandgap voltage reference circuit of FIG. 2 having standard supply voltage and operating at a temperature of −35° C.

FIGS. 6A, 6B, 7A, and 7B are simulation results illustrating an effect of varying supply voltage $V_{DD}$ for the circuit designed to operate with low and standard supply voltages. As shown in FIGS. 6A and 6B, the voltage bandgap reference circuit 200 with low supply voltage $V_{DD}$ has relatively stable voltage $V_{BG}$ for supply voltages greater than 1.5 Volts. Similarly, as shown in FIGS. 7A and 7B, the voltage bandgap reference circuit 200 with standard supply voltage $V_{DD}$ has relatively stable voltage $V_{BG}$ for supply voltages greater than 1.5 Volts.

FIGS. 6A and 6B illustrate various circuit node voltages for the exemplary embodiment of the bandgap reference voltage circuit 200 as shown in FIG. 2 designed for a low supply voltage $V_{DD}$ of 1.8 volts. In FIG. 6A, circuit node voltages are shown as a function of supply voltage $V_{DD}$ for the circuit operating at a temperature of 125° C. In FIG. 6B, circuit node voltages are shown as a function of supply voltage $V_{DD}$ for the circuit operating at a temperature of −35° C. In FIGS. 6A and 6B, the supply voltage $V_{DD}$ is varied from 1.0 volt to 4.0 volts, the voltage $V_{DS}$ is the voltage across the drain and source of MOS devices 102 and 104, and the voltage $V_{CE}$ is the voltage across the collector and emitter of PNP transistor 108.

FIGS. 7A and 7B illustrate various circuit node voltages for bandgap reference voltage circuit 200 of FIG. 2 designed for a standard supply voltage $V_{DD}$ of 2.4 volts. In FIG. 7A, circuit node voltages are shown as a function of supply voltage $V_{DD}$ for the circuit operating at a temperature of 125° C. In FIG. 7B, circuit node voltages are shown as a function of supply voltage $V_{DD}$ for the circuit operating at a temperature of −35° C. In FIGS. 7A and 7B, the supply voltage $V_{DD}$ is varied from 1.0 to 4.0 volts, the voltage $V_{DS}$ is the voltage across the drain and source of MOS devices 102 and 104, and the voltage $V_{CE}$ is the voltage across the collector and emitter of PNP transistor 108.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An integrated circuit having a bandgap voltage reference circuit (e.g., 100 in FIG. 1) comprising:

- a proportional to absolute temperature (PTAT) voltage generator (e.g., 190) adapted to generate:
  - in a first current path, a first PTAT voltage across a first impedance (e.g., 110) and a second PTAT voltage across a first device (e.g., 106); and
  - in a second current path, a third PTAT voltage across a second device (e.g., 108), wherein:
    - each of the first and second devices generating the second and third PTAT voltages operates in accordance with a diode junction equation for the corresponding device;
    - the first device is coupled in series with the first impedance in the first current path; and
    - the PTAT voltage generator includes a feedback amplifier coupled to receive the sum of the first and second PTAT voltages at its first input terminal and the third PTAT voltage at its second input terminal, a feedback voltage signal at the output terminal of the feedback amplifier employed to regulate the current in the first and second current paths such that a sum of the first and second PTAT voltages is substantially equivalent to the third PTAT voltage; and
- a voltage buffer (e.g., 192) 1) receiving, at its first input terminal, a voltage across a second impedance (e.g., 124) coupled in a feedback path between an output terminal of the voltage buffer and the one input terminal, and 2) receiving, at its second terminal the third PTAT voltage to generate a bandgap voltage at the output terminal of the voltage buffer (e.g., N4), wherein:

the voltage across and current through the second impedance are substantially proportional to the first PTAT voltage across and current through the first impedance, respectively; and current through the feedback path of the voltage buffer regulates the voltage across the second impedance in accordance with the third PTAT voltage so as to regulate the bandgap voltage.

2. The invention as recited in claim 1, wherein the feedback amplifier comprises:

an operational amplifier (e.g. 112) adapted to receive at the first input terminal the sum of the first and second PTAT voltages and at the second input terminal the third PTAT voltage and to generate the feedback voltage signal; and a first current mirror (e.g., 160), responsive to the feedback voltage signal, providing a first current in the first current path proportional to a second current in the second current path, wherein the first current mirror generates the current in the first and second current paths such that the sum of the first and second PTAT voltages is substantially equivalent to the third PTAT voltage.

3. The invention as recited in claim 2, wherein:

the first and second devices of the PTAT voltage generator are transistors (e.g., 106, 108), each transistor having a corresponding device size (e.g., Q1, Q2); and the first current mirror of the PTAT voltage generator comprises an MOS device (e.g., 102, 104) with a corresponding MOS device size (e.g., M1, M2) in each of the first and second current paths, a proportion of the first and second currents based on a ratio of the MOS device sizes, wherein the first PTAT voltage is related to a difference between the base-to-emitter voltages of the first and second devices, the difference being related, by the diode junction equation, to a ratio of 1) the ratio of MOS device sizes and 2) a ratio of device sizes of the first and second devices.

4. The invention as recited in claim 1, wherein the voltage buffer comprises:

a second current mirror (e.g., 114, 170) providing a third current in a third current path proportional to the first current;

an operational amplifier (e.g., 116) adapted to receive at one input terminal the voltage across the second impedance and at the other terminal the third PTAT voltage and to provide the bandgap voltage, wherein a portion of the current in the third path flows through the second impedance to provide the voltage across the second impedance in proportion to the first PTAT voltage.

5. The invention as recited in claim 4, wherein the bandgap voltage is tuned based on a ratio of the first and second impedances (e.g., R1/R2).

6. The invention as recited in claim 4, further comprising a resistor-divider circuit having at least two resistors in series (e.g., 207 and 209 of FIG. 2) and electrically coupled between the output terminal of the voltage buffer and a common node.

7. The invention as recited in claim 1, wherein the PTAT voltage generator is coupled to a regulated voltage terminal, and the bandgap voltage reference circuit further comprises:

a current source (e.g., 150) coupled between the regulated voltage terminal and a supply voltage, the current source providing a circuit current for the bandgap voltage reference circuit, wherein the regulated voltage at the regulated voltage terminal drives the PTAT voltage generator.

8. The invention as recited in claim 7, further comprising a voltage regulator (e.g., 204, 206) coupled between the output terminal of the voltage buffer and the regulated voltage terminal to vary the regulated voltage with absolute temperature based on the bandgap voltage.

9. The invention as recited in claim 7, further comprising a current bias generator (e.g., 202) coupled between the output terminal of the voltage buffer and the regulated voltage terminal, the current bias generator providing a PTAT reference bias current from the current source proportional to the first current.

10. The invention as recited in claim 1, wherein the bandgap voltage reference circuit further comprises a start-up circuit (e.g., 201) coupled to a supply voltage and adapted to generate a start-up current through the first and second current paths to provide a non-zero bandgap voltage.

11. The invention as recited in claim 1, wherein the voltage buffer combines the third PTAT voltage with the voltage across the second impedance so as to form the bandgap voltage substantially independent of temperature.

12. A method of generating a bandgap voltage comprising the steps of:

a) generating a first PTAT voltage across a first impedance and a second PTAT voltage across a first device in a first current path;

b) generating a third PTAT voltage across a second device in a second current path, each of the first and second devices generating the second and third PTAT voltages operates in accordance with a diode junction equation for the corresponding device;

c) regulating, with a feedback voltage signal of a feedback amplifier, the current in the first and second current paths such that a sum of the first and second PTAT voltages is substantially equivalent to the third PTAT voltage, the sum of the first and second PTAT voltages provided to a first input terminal of the feedback amplifier and the third PTAT voltage provided to a second input terminal of the feedback amplifier;

d) generating, with a voltage buffer, the bandgap voltage from 1) a voltage across a second impedance in a feedback path from the output of the voltage buffer to a first input terminal of the voltage buffer and 2) the third PTAT voltage at a second input terminal of the voltage buffer, the voltage across and current through the second impedance being substantially proportional to the first PTAT voltage across and current through the first impedance, respectively; and e) regulating the voltage across the second impedance with the current through the feedback path based on the third PTAT voltage so as to regulate the bandgap voltage.

13. The method as recited in claim 12, further comprising the steps of:

f) generating a feedback voltage signal based on the sum of the first and second PTAT voltages and the third PTAT voltage; and g) mirroring, responsive to the feedback voltage signal, a first current in the first current path proportional to a second current in the second current path; and wherein the step g) mirrors the current in the first and second current paths to minimize a voltage difference between 1) the sum of the first and second PTAT voltages and 2) the third PTAT voltage.

14. The method as recited in claim 12, further comprising the steps of:

h) providing a third current in a third current path proportional to the first current; and i) generating the bandgap voltage based on the voltage across the second impedance and the third PTAT voltage, a portion of the current in the third path flowing through the second impedance to provide the voltage across the second impedance in proportion to the first PTAT voltage.

15. The method as recited in claim 12, further comprising the step of varying the regulated voltage with absolute temperature based on the bandgap voltage.

16. The method as recited in claim 12, further comprising the step of initially generating a start-up current through the first and second current paths to provide a non-zero bandgap voltage.

17. The method as recited in claim 12, wherein the step d) further comprises the step of combining the third PTAT voltage with the voltage across the second impedance so as to form the bandgap voltage substantially independent of temperature.

18. A bandgap voltage reference circuit comprising:

PTAT voltage generating means for 1) generating a first PTAT voltage across a first impedance and a second PTAT voltage across a first device in a first current path, and 2) generating a third PTAT voltage across a second device in a second current path, each of the devices generating the second and third PTAT voltages operates in accordances with a diode junction equation for the corresponding device;

voltage biasing means for regulating, with a feedback voltage signal of a feedback amplifier, the current in the first and second current paths such that a sum of the first and second PTAT voltages is substantially equivalent to the third PTAT voltage, a sum of the first and second PTAT voltages provide to a first input terminal of the feedback amplifier and the third PTAT voltage provided to a second input terminal of the feedback amplifier;

bandgap voltage generating means for 1) generating, with a voltage buffer, the bandgap voltage from 1) a voltage across a second impedance in a feedback path from the output of the voltage to a first input terminal of the voltage buffer and 2) the third PTAT voltage at a second input terminal of the voltage buffer, the voltage across and current through the second impedance being substantially proportional to the first PTAT voltage across and current through the first impedance, respectively; and means for regulating the voltage across the second impedance with the current through the feedback path based on the third PTAT voltage so as to regulate the bandgap voltage.

19. The invention as recited in claim 18, wherein the voltage biasing means further includes means for generating a feedback voltage signal based on the sum of the first and second PTAT voltages and the third PTAT voltage; and the PTAT voltage generating means further includes current mirroring means, responsive to the feedback voltage signal, for providing a first current in the first current path proportional to a second current in the second current path; and wherein the current mirroring means mirrors the current in the first and second current paths to minimize a voltage difference between 1) the sum of the first and second PTAT voltages and 2) the third PTAT voltage.

20. The invention as recited in claim 18, further comprising a current mirroring means for providing a third current in a third current path proportional to the first current, and wherein:

a portion of the current in the third path flows through the second impedance to provide the voltage across the second impedance in proportion to the first PTAT voltage; and the bandgap voltage generating means generates the bandgap voltage based on the voltage across the second impedance and the third PTAT voltage. third PTAT voltages operates in accordance with a diode junction equation for the corresponding device;

voltage biasing means for regulating, with a feedback voltage signal of a feedback amplifier, the current in the first and second current paths such that a sum of the first and second PTAT voltages is substantially equivalent to the third PTAT voltage, a sum of the first and second PTAT voltages provided to a first input terminal of the feedback amplifier and the third PTAT voltage provided to a second input terminal of the feedback amplifier;

bandgap voltage generating means for 1) generating, with a voltage buffer, the bandgap voltage from 1) a voltage across a second impedance in a feedback path from the output of the voltage buffer to a first input terminal of the voltage buffer and 2) the third PTAT voltage at a second input terminal of the voltage buffer, the voltage across and current through the second impedance being substantially proportional to the first PTAT voltage across and current through the first impedance, respectively; and means for regulating the voltage across the second impedance with the current through the feedback path based on the third PTAT voltage so as to regulate the bandgap voltage.

21. An integrated circuit having a bandgap voltage reference circuit (e.g., 100 in FIG. 1) comprising:

a proportional to absolute temperature (PTAT) voltage generator (e.g., 190) adapted to generate:

in a first current path, a first PTAT voltage across a first impedance (e.g., 110) and a second PTAT voltage across a first device (e.g., 106); and in a second current path, a third PTAT voltage across a second device (e.g., 108), wherein:

each of the first and second devices generating the second and third PTAT voltages operates in accordance with a diode junction equation for the corresponding device;

the first device is coupled in series with the first impedance in the first current path; and the PTAT voltage generator includes a feedback amplifier coupled to receive the sum of the first and second PTAT voltages at its first input terminal and the third PTAT voltage at its second input terminal, the feedback voltage signal at the output terminal of the feedback amplifier employed to regulate the current in the first and second current paths such that a sum of the first and second PTAT voltages is substantially equivalent to the third PTAT voltage; and a voltage buffer (e.g., 192) adapted to receive a voltage across a second impedance (e.g., 124) and the third PTAT voltage to generate a bandgap voltage at an output terminal (e.g., N4), wherein:

the voltage buffer comprises:

a second current mirror (e.g., 114, 170) providing a third current in a third current path proportional to the first current;

an operational amplifier (e.g., 116) adapted to receive at one input terminal the voltage across the second impedance and at the other terminal the third PTAT voltage and to provide the bandgap voltage, and wherein:

1) a portion of the current in the third path flows through the second impedance to provide the voltage across the second impedance in proportion to the first PTAT voltage, 2) the voltage across and current through the second impedance are substantially proportional to the first PTAT voltage across and current through the first impedance, respectively; and 3) the voltage buffer biases the voltage across the second impedance with the third PTAT voltage so as to regulate the bandgap voltage.

22. The invention as recited in claim 21, wherein the bandgap voltage is tuned based on a ratio of the first and second impedances (e.g., R1/R2).

23. The invention as recited in claim 21, further comprising a resistor-divider circuit having at least two resistors in series (e.g., 207 and 209 of FIG. 2) and electrically coupled between the output terminal of the voltage buffer and a common node.

* * * * *